(12) United States Patent
Choi et al.

(10) Patent No.: US 12,018,650 B2
(45) Date of Patent: Jun. 25, 2024

(54) AERO WIND POWER GENERATION DEVICE

(71) Applicants: Hyundai Motor Company, Seoul (KR); Kia Corporation, Seoul (KR)

(72) Inventors: Jung Hun Choi, Whasung-Si (KR); Dong Hyun Ha, Whasung-Si (KR); Jae Wung Jung, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/105,446

(22) Filed: Feb. 3, 2023

(65) Prior Publication Data
US 2023/0250798 A1    Aug. 10, 2023

(30) Foreign Application Priority Data

Feb. 4, 2022  (KR) .......... 10-2022-0014627

(51) Int. Cl.
| | |
|---|---|
| *F03D 5/00* | (2006.01) |
| *B64U 10/30* | (2023.01) |
| *B64U 10/60* | (2023.01) |
| *B64U 101/10* | (2023.01) |

(52) U.S. Cl.
CPC .............. *F03D 5/00* (2013.01); *B64U 10/30* (2023.01); *B64U 10/60* (2023.01); *B64U 2101/10* (2023.01); *F05B 2220/706* (2013.01)

(58) Field of Classification Search
CPC .............. F03D 5/00; F03D 9/322; F03D 9/00; F03D 9/25; F03D 9/32; F03D 3/005; B64U 10/30; B64U 10/60; B64U 2101/10; B64U 2101/00; B64U 10/10; B64U 30/20; F05B 2220/706; F05B 2240/922; F05B 2240/211; F05B 2240/923; Y02E 10/72; Y02E 10/74; B64B 1/40; B64C 39/022; B64C 39/024
See application file for complete search history.

(56) References Cited

U.S. PATENT DOCUMENTS

| | | | | |
|---|---|---|---|---|
| 10,800,505 | B1 * | 10/2020 | Edsinger | H04L 67/535 |
| 10,894,591 | B2 * | 1/2021 | Egan | B64B 1/58 |
| 2018/0304981 | A1 * | 10/2018 | Piette | B64B 1/66 |

* cited by examiner

*Primary Examiner* — Joseph Ortega
(74) *Attorney, Agent, or Firm* — MORGAN, LEWIS & BOCKIUS LLP (57) ABSTRACT

An aero wind power generation device may include a drone unit including drone wings configured to make the aero wind power generation device move and hover and a sensor unit configured to detect information for controlling the aero wind power generation device; a buoyancy generation unit including a side cover configured to open or close, a balloon disposed inside the side cover and configured to receive gas therein or release the gas therefrom, and a wire configured to surround the balloon; and a power generation unit including a rotating unit with a plurality of blades, a blade control unit of adjusting a state of the blades, and a motor unit of converting kinetic energy transferred from the rotating unit into electrical energy.

20 Claims, 9 Drawing Sheets

AERO WIND POWER GENERATION DEVICE

CROSS-REFERENCE TO RELATED APPLICATIONS

The present application claims priority to Korean Patent Application No. 10-2022-0014627, filed on Feb. 4, 2022, the entire contents of which is incorporated herein for all purposes by this reference.

BACKGROUND OF THE PRESENT DISCLOSURE

Field of the Present Disclosure

The present disclosure relates to an aero wind power generation device.

Description of Related Art

The description in the present section merely provides background information related to the present disclosure and does not necessarily form the related art.

Environmentally friendly vehicles such as electric vehicles are being developed and commercialized. Charging electric vehicles takes longer to charge than filling internal combustion engine vehicles with fuel. Nevertheless, in the case of passenger cars, they may be charged at charging stations typically found in parking lots of buildings or the like, while they are not in use (for example, at night).

On the other hand, commercial trucks are usually parked in remote areas on the outskirts of cities, which makes it hard to charge vehicles at charging stations when they are not in use (for example, at night). Also, there is no way to get electric power even if a self-charging cable is available because charging stations are hard to find on the outskirts of cities, and even if charging stations are provided outside of town, in terms of practicality, it is difficult for a commercial truck to always drive to the designated places to charge.

In general, the wind gets faster with altitude, and as the wind speed increases, wind power generation produces more electrical energy. Wind power generation at lower altitudes cannot produce enough electrical energy. Another problem is that the production of constant amounts of electrical energy depends on external variables such as weather conditions.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an aero wind power generation device which may allow vehicles to be charged at all times by converting wind power energy into electrical energy.

An aero wind power generation device according to various exemplary embodiments of the present disclosure may produce electrical energy by use of high-altitude, high-speed winds and moving depending on weather conditions.

The aspects of the present disclosure are not limited to the foregoing, and other aspects not mentioned herein will be able to be clearly understood by those skilled in the art from the following description.

According to at least an exemplary embodiment of the present disclosure, the present disclosure provides an aero wind power generation device including: a drone unit including drone wings configured to make the aero wind power generation device move and hover and a sensor unit configured to detect information for controlling the aero wind power generation device; a buoyancy generation unit including a side cover configured to open or close, a balloon disposed inside the side cover and configured to receive gas therein or release the gas therefrom, and a wire configured to surround the balloon; and a power generation unit including a rotating unit with a plurality of blades, a blade control unit of adjusting a state of the blades, and a motor unit of converting kinetic energy transferred from the rotating unit into electrical energy.

According to at least an exemplary embodiment of the present disclosure, the present disclosure provides an aero wind power generation device including: a drone unit including drone wings configured to make the aero wind power generation device move and hover and a sensor unit configured to detect information for controlling the aero wind power generation device; a buoyancy generation unit including a side cover configured to open or close, and a collapsible balloon disposed inside the side cover and configured to receive gas therein or release the gas therefrom and enable collapsing and spreading thereby; and a power generation unit including a rotating unit with a plurality of blades, a blade control unit of adjusting a state of the blades, and a motor unit of converting kinetic energy transferred from the rotating unit into electrical energy.

According to various exemplary embodiments of the present disclosure, an aero wind power generation device may be mounted in a vehicle and has the effect of converting wind power energy into electrical energy and charging the vehicle regardless of time and place.

According to various exemplary embodiments of the present disclosure, an aero wind power generation device has the effect of effectively producing electrical energy by use of high-altitude, high-speed winds and moving depending on weather conditions.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Some exemplary embodiments of the present disclosure are described below with reference to the accompanying drawings. In the following description, like reference numerals preferably designate like elements, although the elements are shown in different drawings. Furthermore, in the following description of various exemplary embodiments of the present disclosure, a detailed description of known functions and configurations incorporated herein will be omitted for clarity and for brevity.

Additionally, alphanumeric codes such as first, second, i), ii), a), b), etc., in numbering components are used solely for differentiating one component from the other but not to imply or suggest the substances, the order, or sequence of the components. Throughout the present specification, when parts "include" or "comprise" a component, they are meant to further include other components, not excluding thereof unless there is a description contrary thereto.

Figure 1:
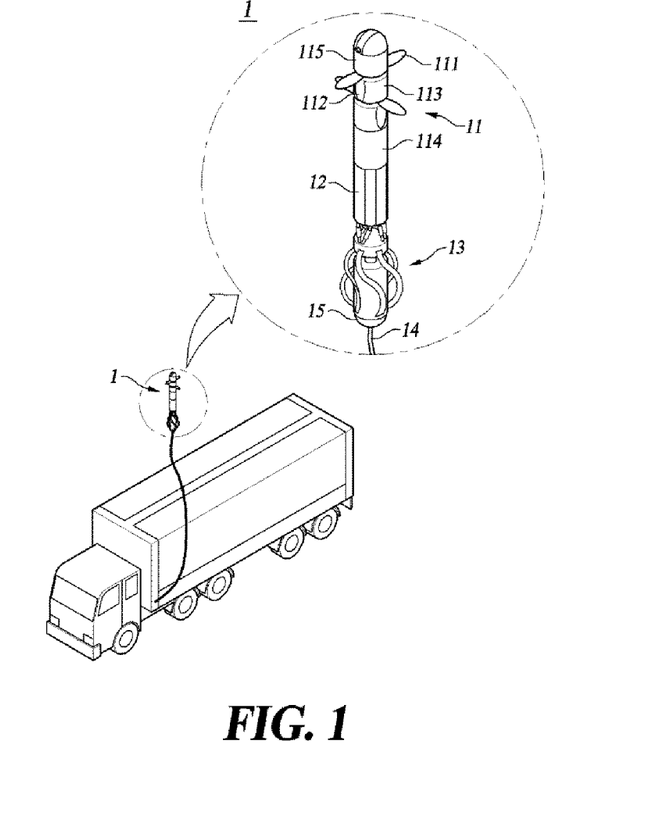
FIG. 1 is a perspective view of how an aero wind power generation device is coupled according to various exemplary embodiments of the present disclosure.

FIG. 1 is a perspective view of how an aero wind power generation device is coupled according to various exemplary embodiments of the present disclosure.

Referring to FIG. 1, an aero wind power generation device 1 according to various exemplary embodiments of the present disclosure may include all or part of a drone unit 11, a buoyancy generation unit 12, a power generation unit 13, a cable 14, and a magnet 15.

The aero wind power generation device 1 may convert wind energy into electrical energy in the air, and charge a vehicle's battery directly by use of the electrical energy and transmit produced electrical energy to a plant or a charging station. Thus, a vehicle provided with the aero wind power generation device 1 does not have to be driven to a charging station and therefore may be charged anywhere regardless of location. Also, the plant or charging station may use the electrical energy produced by the aero wind power generation device 1 in a variety of ways, including for selling the energy or producing hydrogen through water electrolysis using electrical energy and selling it.

The aero wind power generation device 1 may produce electrical energy by use of good quality wind at or below a critical altitude of 150 m. It is possible to efficiently produce electrical energy within a short time period by use of high-altitude, high-speed winds. Also, the aero wind power generation device 1 may move in terms of altitude and location depending on external variables such as weather conditions, for efficient production of electrical energy.

For the aero wind power generation device 1 to produce electrical energy, the drone unit 11 may control the aero wind power generation device 1 so that the aero wind power generation device 1 takes off and hovers. Hovering refers to the state in which an aircraft, a drone, etc. stays in the same position at a certain altitude.

The buoyancy generation unit 12 may assist the drone unit 11 in controlling the aero wind power generation device 1 to take off and hover. The buoyancy generation unit 12 may cause the aero wind power generation device 1 to float by use of a gas including a lower density than air, such as helium gas.

The power generation unit 13 may convert wind energy caused by a wind up in the air. It may convert wind energy into rotational kinetic energy and convert the rotational kinetic energy into electrical energy. Electrical energy produced by the power generation unit 13 may be transmitted to a vehicle, a plant, or a charging station by use of the cable 14. One end portion of the cable 14 may be connected to the aero wind power generation device 1, and the other end portion may be connected to a vehicle, a plant, or a charging station. The cable may be flexible type to minimize damage from weather events.

The aero wind power generation device 1 may be in the shape of a pillar in which the drone unit 11, the buoyancy generation unit 12, the power generation unit 13, and the magnet 15 are sequentially coupled from the top. The magnet 15 may be coupled to a bottom portion of the power generation unit 13, that is, an end portion of the aero wind power generation device 1, so that the aero wind power generation device 1 is docked to a vehicle, a plant or a charging station. The shape and order of coupling of the aero wind power generation device 1 are not limited to this, and may be coupled in various ways as needed.

Referring to FIG. 1, the drone unit 11 may include all or part of drone wings 111, wing grooves 112, drone motors 113, a battery unit 114, a sensor unit 115, and a drone controller.

The drone wings 111 may have a multi-rotor structure including a pair of first drone wings and a pair of second drone wings. The pair of first drone wings may be coupled in such a way as to have a phase difference of 90 degrees from the pair of second drone wings. Depending on the hovering performance required, the drone unit 11 may include one to eight pairs of drone wings 111.

The drone wings 111 may be configured to spread when the aero wind power generation device 1 takes off or hovers and to be collapsible while coupled to a vehicle or the like. A plurality of wing grooves 112 may be formed on one side of the drone unit 11 so that the drone wings 11 are collapsible. The wing grooves 112 may be formed at a predetermined depth on one side of the drone unit 11, corresponding to the number and shape of the drone wings 111.

The drone motors 113 may include a first drone motor configured to control the first drone wings and a second drone motor configured to control the second drone wings. The drone motors 113 may control the drone wings 111 so that the aero wind power generation device 1 takes off, hovers, and travels.

The battery unit 114 may include a plurality of batteries configured to supply electric power to the drone motors 113. The batteries may be high-density lithium polymer batteries with a voltage rating of 3.7 V, and 6-cell lithium polymer batteries may be mounted on the battery unit 114.

The sensor unit 115 may include all or part of a camera, a hygrometer, a wind gauge, an accelerometer, a gyro, and an ultra-wide band (UWB) sensor.

The camera may detect objects around the aero wind power generation device 1 to prevent collision with surrounding objects. The camera may be coupled at the top portion of the drone unit 11 to rotate 360 degrees. The hygrometer may monitor humidity with respect to the altitude of the aero wind power generation device 1. The wind gauge may assist in controlling blades 1321 and a reducer 1323 of the power generation unit 13 by monitoring wind strength. The accelerometer and the gyroscope may provide a target hovering value for the aero wind power generation device 1 in preparation for weather conditions (e.g., strong wind) by measuring the acceleration of the aero wind power generation device 1. The UW B sensor may measure the position of the aero wind power generation device 1 so that the aero wind power generation device 1 makes an accurate landing.

The drone controller may be configured to control the drone unit 11 by use of information detected by the sensor unit 115. For example, the drone controller may use information detected by the sensor unit 115 and control the drone wings 111 and the drone motors 113, for the aero wind power generation device 1 to take off, hover, and move.

Figure 2:
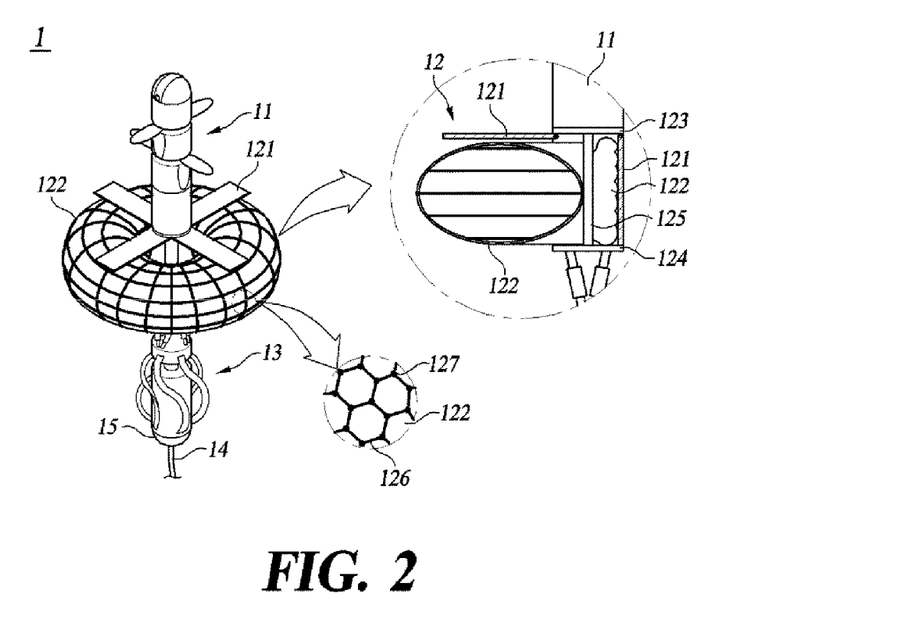
FIG. 2 is an enlarged view of a buoyancy generation unit of an aero wind power generation device according to various exemplary embodiments of the present disclosure.

FIG. 2 is an enlarged view of a buoyancy generation unit of an aero wind power generation device according to various exemplary embodiments of the present disclosure.

Referring to FIG. 2, the buoyancy generation unit 12 may include all or part of a side cover 121, a balloon 122, an upper cover 123, a lower cover 124, and a support 125.

The side cover 121 may form an external side of the buoyancy generation unit 12. The upper cover 123 may be positioned in an upper portion of the buoyancy generation unit 12 and coupled to the drone unit 11, and the lower cover 124 may be positioned in a lower portion of the buoyancy generation unit 12 and coupled to the power generation unit 13. The support 125 may be coupled between the upper cover 123 and the lower cover 124 and support the buoyancy generation unit 12 when the side cover 121 is opened.

The side cover 121 may be configured to open or close as the aero wind power generation device 1 takes off and lands. The side cover 121 may be configured so that the external side of the buoyancy generation unit 12 opens or closes in four sections. All or part of the sections of the side cover 121 may be opened if necessary. The side cover 121 may be opened as it spreads out over the buoyancy generation unit 12. That is, when the side cover 121 opens, the side cover 121 and the upper cover 123 may remain coupled to each other, and the side cover 121 and the lower cover 124 may be decoupled from each other. However, the present disclosure is not limited thereto, and the side cover 121 may be opened by spreading downward of the buoyancy generation unit 12.

A gas lighter than air, such as helium gas, may be injected into the balloon 122. When the aero wind power generation device 1 takes off or hovers, the balloon 122 may be filled with helium gas. The balloon 122 filled with helium gas may assist the aero wind power generation device 1 in saving energy consumed for take off and hovering of the aero wind power generation device 1. The buoyancy generation unit 12 may further include a gas inlet for injecting and retrieving helium gas into and from the balloon 122. Also, the balloon 122 may be made of a urethane material with high durability to prevent damage from a weather condition or collision with other objects.

The balloon 122 may be disposed inside the side cover 12, and when the aero wind power generation device 1 takes off, the side cover 121 may be opened, and helium gas may be injected into the balloon 122. When the aero wind power generation device 1 lands, the helium gas may be retrieved from the balloon 122, and the side cover 121 may be closed. The volume of the balloon 122 may be so that the balloon 122 filled up with helium gas has a buoyancy greater than the weight of the aero wind power generation device 1. Referring to FIG. 2, in a state in which helium gas is injected, the balloon 122 may have a donut shape.

Referring to FIG. 2, the buoyancy generation unit 12 may further include a wire 126 and a connection ball 127.

The wire 126 may surround the balloon 122 in a form of fabric in various structures. For example, the wire 126 may have a cobweb-shaped structure. Because the wire 126 includes a highly elastic material, it is configured as a frame for the balloon 122 to have a constant form. That is, when helium gas is injected into the balloon 122, the balloon 122 may be inflated while maintaining a predetermined form because of the wire 126.

When the helium gas is retrieved from the balloon 122, the wire 126 may apply a compressive force to the balloon 122. The wire 126 may assist the retrieval process of the balloon 122 by applying a compressive force to all directions of the balloon 122 so that the inflated balloon 122 may be compressed or collapsed as much as possible.

The connection ball 127 may be provided for each connection unit of the balloon 122 and the wire 126. The connection ball 127 is a high-density urethane ball, and by improving the durability of the wire 126, it is possible to prevent damage to the wire 126 even in repeated compression and expansion of the balloon 122. When the balloon 122 is compressed or inflated, the connection ball 127 is primarily compressed or inflated, and the wire 126 is secondarily compressed or inflated, improving the durability of the wire 126.

Helium gas may be injected into the balloon 122 of the buoyancy generation unit 12 by use of an inlet nozzle provided in a vehicle or a charging station for take-off of the aero wind power generation device 1.

When the aero wind power generation device 1 lands, the helium gas may be retrieved from the balloon 122 by use of the cable 14 until the aero wind power generation device 1 docks to a vehicle or a charging station. In the present connection, the cable 14 may include a tube configured to retrieve the helium gas. After the aero wind power generation device 1 is docked to the vehicle or charging station, the helium gas may be retrieved from the balloon 122 using an outlet nozzle provided in the vehicle or charging station.

Figure 3:
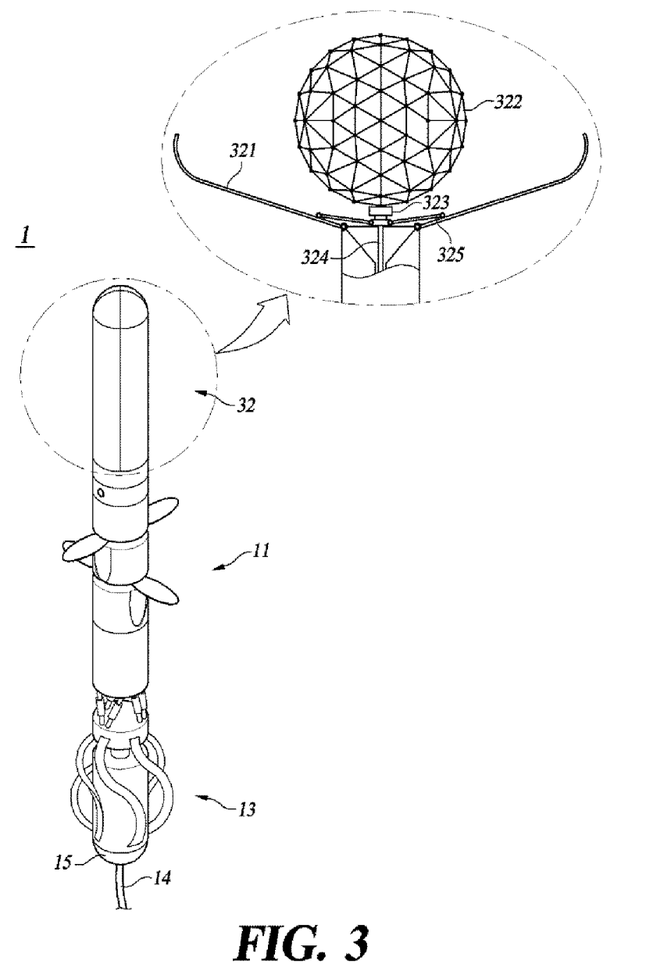
FIG. 3 is an enlarged view of a buoyancy generation unit of an aero wind power generation device according to various exemplary embodiments of the present disclosure.

FIG. 3 is an enlarged view of a buoyancy generation unit of an aero wind power generation device according to various exemplary embodiments of the present disclosure.

Figure 4:
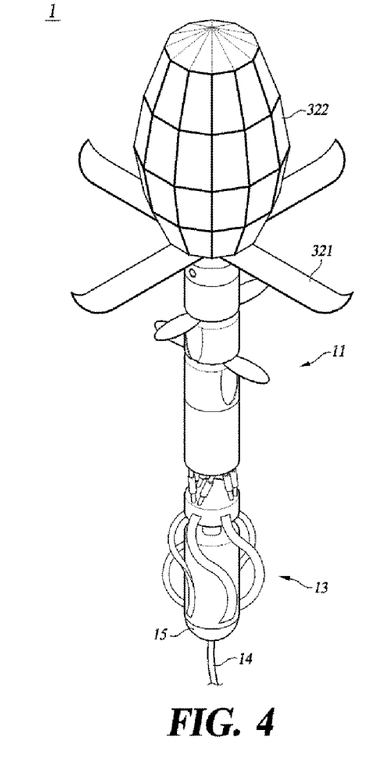
FIG. 4 is a perspective view of how an aero wind power generation device is coupled according to various exemplary embodiments of the present disclosure.

FIG. 4 is a perspective view of how an aero wind power generation device is coupled according to various exemplary embodiments of the present disclosure.

Referring to FIG. 3 and FIG. 4, in the aero wind power generation device 1 according to the various exemplary embodiments of the present disclosure, the buoyancy generation unit 32, the drone unit 11, and the power generation unit 13 may be sequentially coupled. That is, buoyancy generation unit 32 may be coupled to be disposed on an upper end portion of the aero wind power generation device 1. Items in common with the aero wind power generation device 1 according to an exemplary embodiment of the present disclosure are replaced with the above-mentioned content and detailed descriptions thereof are omitted hereinafter.

The buoyancy generation unit 32 according to the various exemplary embodiments of the present disclosure may include all or part of a side cover 321, a balloon 322, and a support 323. The side cover 321 may be configured to open or close as the aero wind power generation device 1 takes off and lands. The side cover 321 may be configured so that the external side of the buoyancy generation unit 32 opens or closes in four sections. All or part of the sections of the side cover 321 may be opened if necessary. An opening or closing mechanism of the side cover 321 will be described in detail below.

The balloon 322 of the aero wind power generation device 1 according to the various exemplary embodiments of the present disclosure may have a sphere or ellipse sphere shape. Like the various exemplary embodiments of the present disclosure, the balloon 322 may be made of a urethane material with predetermined durability, and may be formed so that a wire and a connection ball surround the balloon 322. Because the shape of the balloon 322 is a spherical or elliptical sphere, in the various exemplary embodiments of the present disclosure, the buoyancy generation unit 32 may be coupled to be disposed on an upper end portion of the aero wind power generation device 1.

When the aero wind power generation device 1 takes off or hovers, helium gas may be injected into the balloon 322. The balloon 322 filled with helium gas may assist the aero wind power generation device 1 in saving energy consumed for take off and hovering of the aero wind power generation device 1.

The balloon 322 may be disposed inside the side cover 321, and when the aero wind power generation device 1 takes off, the side cover 121 may be opened, and helium gas may be injected into the balloon 322. When the aero wind power generation device 1 lands, the helium gas may be retrieved from the balloon 322, and the side cover 321 may be closed.

Figure 5A:
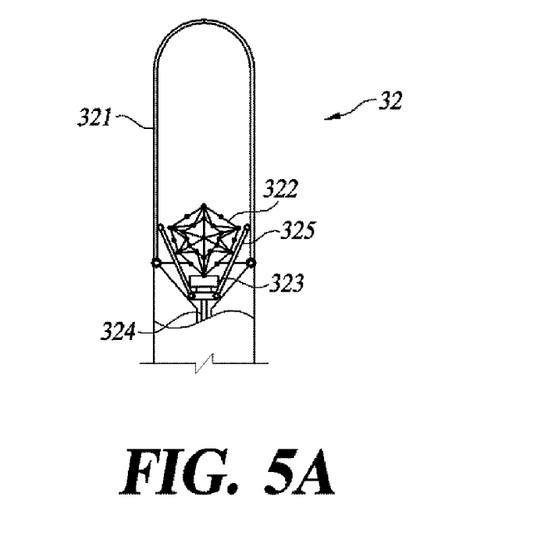
FIG. 5A and FIG. 5B are views showing an opening and closing process of a buoyancy generation unit of an aero wind power generation device according to various exemplary embodiments of the present disclosure.
Figure 5B:
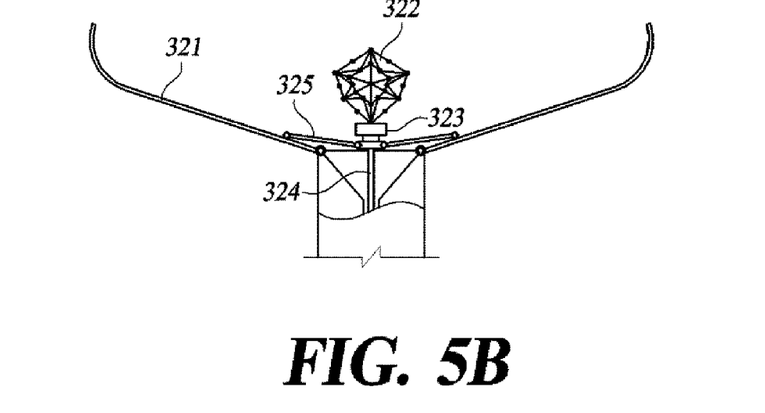

FIG. 5A and FIG. 5B are views showing an opening and closing process of a buoyancy generation unit of an aero wind power generation device according to various exemplary embodiments of the present disclosure.

Referring to FIG. 5A and FIG. 5B, the buoyancy generation unit 32 according to the various exemplary embodiments of the present disclosure may further include a piston 324 and a hinge 325.

The opening and closing of the buoyancy generation unit 32 may use a bar linkage mechanism. The side cover 321 may be connected to one end portion of the hinge 325, and the other end portion of the hinge 325 may be connected to the piston 324. In a state in which the buoyancy generation unit 32 is closed (FIG. 5A), the side cover 321 may be spread downward and the buoyancy generation unit 32 may be opened (FIG. 5B).

A motor inside the buoyancy generation unit 32 operates, and when the piston 324 rises by the motor, the hinge 325 connected to the piston 324 may press the side cover 321. As a result, the side cover 221 connected to the hinge 325 may spread.

When the piston 324 is lowered by the motor, the hinge 325 connected to the piston 324 may pull the side cover 321. Tension is generated in the hinge 325 to close the buoyancy generation unit 32 by collapsing the side cover 221.

Figure 6A:
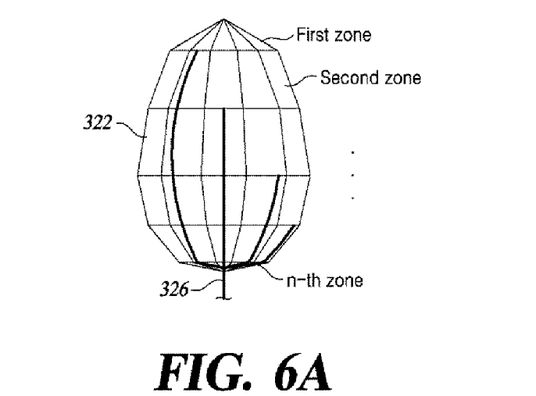
FIG. 6A, FIG. 6B and FIG. 6C are views showing a process in which gas is injected into and retrieved from a balloon according to an exemplary embodiment of the present disclosure.
Figure 6B:
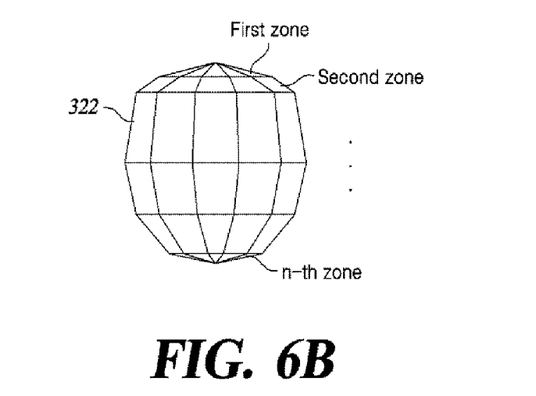
Figure 6C:
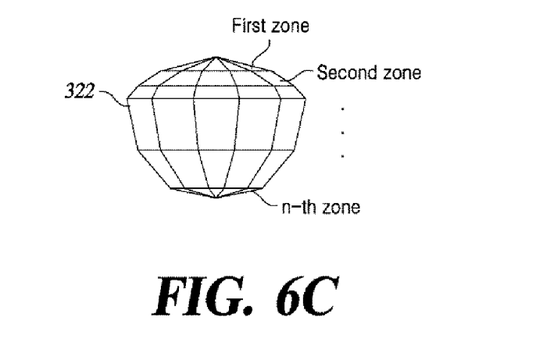

FIG. 6A, FIG. 6B and FIG. 6C are views showing a process in which gas is injected into and retrieved from a balloon according to an exemplary embodiment of the present disclosure.

For convenience of explanation, FIG. 6A, FIG. 6B and FIG. 6C includes the balloon 322 according to the various exemplary embodiments of the present disclosure, but a method for injecting and retrieving helium gas in the balloon 322 may also be applied to the balloon 122 according to the various exemplary embodiments of the present disclosure.

Referring to FIG. 6A, FIG. 6B and FIG. 6C, the balloon 322 may include a plurality of zones. The balloon 322 may include a first zone positioned at an upper end portion, a second zone positioned at a lower end portion of the first zone, and an n-th zone positioned at a lower end portion (wherein, n is a natural number greater than or equal to 2). The first to n-th zones may be sequentially formed.

The buoyancy generation unit 32 may include a plurality of gas inlets 326 individually connected to the first to n-th zones of the balloon 322. By use of a plurality of gas inlets 326, it is possible to adjust the injection and retrieval of helium gas for each zone of the balloon 322.

When the helium gas is injected into the balloon 322, the helium gas may be sequentially injected in an order of the first zone to the n-th zone. Even when the helium gas is retrieved from the balloon 322, the helium gas may be sequentially retrieved in an order of the first zone to the n-th zone. When the helium gas is retrieved, the first zone to the n-th zone are sequentially stacked so that the side cover 321 may be smoothly collapsible. However, the method for injecting and retrieving helium gas is not limited thereto, and it is also possible to sequentially inject and retrieve helium gas in an order of the n-th zone to the first zone, and it is also possible to inject and retrieve helium gas in any order as needed.

Figure 7A:
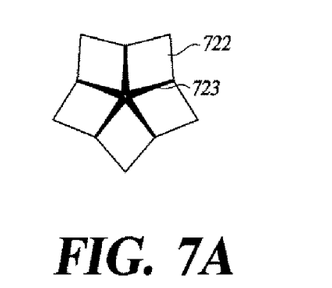
FIG. 7A, FIG. 7B and FIG. 7C are enlarged views of a buoyancy generation unit of an aero wind power generation device according to various exemplary embodiments of the present disclosure.
Figure 7B:
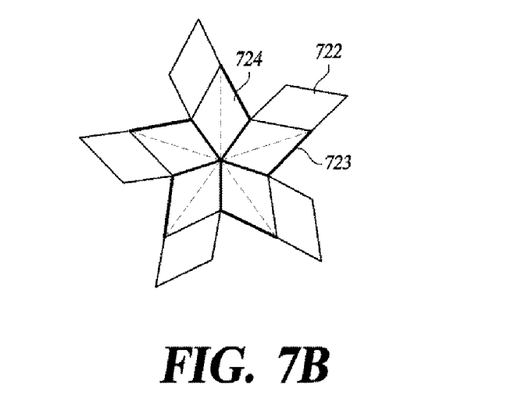
Figure 7C:
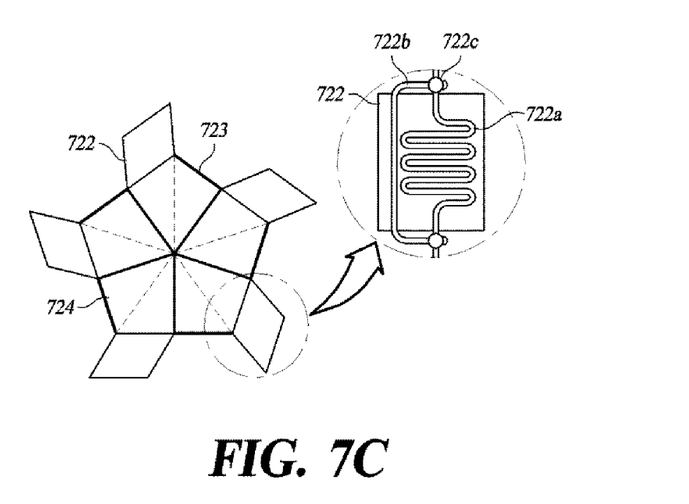

FIG. 7A, FIG. 7B and FIG. 7C are enlarged views of a balloon of an aero wind power generation device according to another exemplary embodiment of the present disclosure.

Referring to FIG. 7A, FIG. 7B and FIG. 7C, the balloon according to various exemplary embodiments of the present disclosure may include all or part of a tube unit 722, a flexible hinge unit 723, and a skin unit 724.

The tube unit 722 includes an Inflatable Kinetic Cell (IKC), and a plurality of tube units 722 are connected to form a structure such as the balloons 122 and 322 according to the various exemplary embodiments of the present disclosure. The tube unit 722 is configured as a frame to form any volume. Helium gas may be injected into the tube unit 722. The shape of the tube unit 722 may be a quadrangle, and may be polygons of various forms as needed.

The flexible hinge unit 723 may be coupled between the adjacent tube units 722. The flexible hinge unit 723 may prevent leakage of helium gas from the tube unit 722 by plasticity thermosetting processing. The flexible hinge unit 723 may facilitate collapsing and spreading of the tube unit 722.

By use of the tube unit 722 including IKC, it is easy to collapse the balloon as small as possible and to form a spreading structure when helium gas is injected. The tube unit 722 may be collapsible and may be collapsed and spread. A skin unit 724 may be connected between the tube units 722. The skin unit 724 is collapsible, and may be collapsed and spread and may be made of a urethane material with high elasticity.

When the tube unit 722 is completely collapsed, the skin unit 724 may be hidden between the tube units 722 (FIG. 7A). As the tube unit 722 spreads, the skin unit 724 hidden between the tube units 722 may gradually spread (FIG. 7B). When the tube unit 722 completely spreads (FIG. 7C), the volume of the balloon may be more than twice that of the tube unit 722.

The tube unit 722 may include a main tube 722a, a bypass tube 722b, a valve 722c, and a wireless communication unit. Helium gas may be injected into the tube unit 722 using the main tube 722a to inflate the tube unit 722. The bypass tube 722b may prevent helium gas from being injected into the tube unit 722 to maintain or reduce the volume of the tube unit 722. The valve 722c may be positioned at a branch point of the main tube 722a and the bypass tube 722b. The valve 722c may be adjusted by selecting one of the main tube 722a or the bypass tube 722b as a path of the helium gas. The wireless communication unit may be disposed adjacent to the valve 722c to control the valve 722c to adjust the path of the helium gas.

Figure 8:
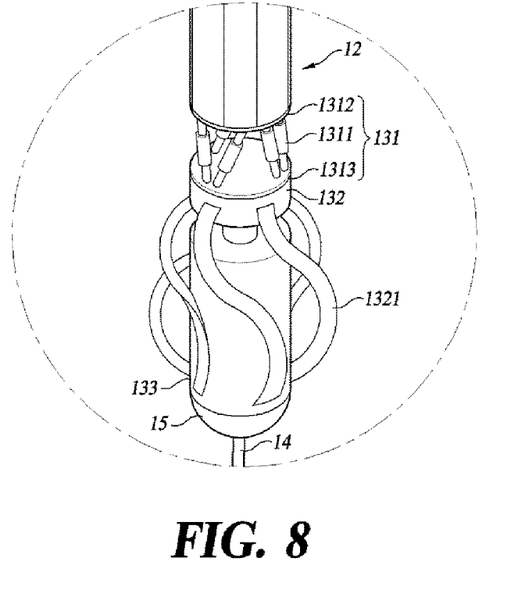
FIG. 8 is an enlarged view of a power generation unit of an aero wind power generation device according to an exemplary embodiment of the present disclosure.

FIG. 8 is an enlarged view of a power generation unit of an aero wind power generation device according to an exemplary embodiment of the present disclosure.

Figure 9:
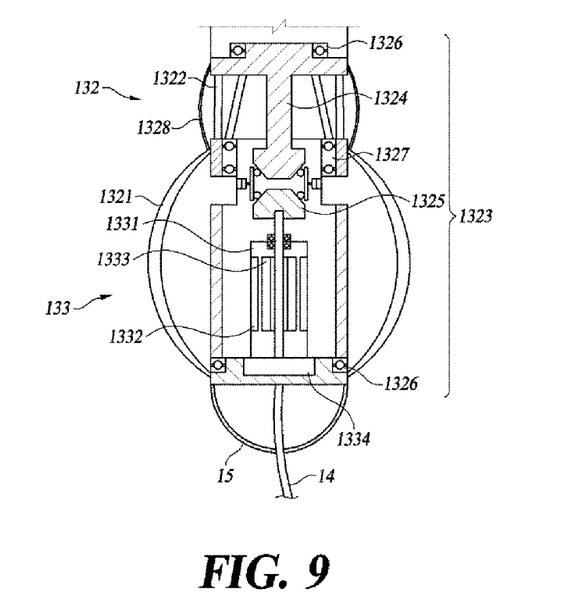
FIG. 9 is a cross-sectional view of a rotating unit and a motor unit of an aero wind power generation device according to an exemplary embodiment of the present disclosure.

FIG. 9 is a cross-sectional view of a rotating unit and a motor unit of an aero wind power generation device according to an exemplary embodiment of the present disclosure.

Referring to FIG. 8 and FIG. 9, the power generation unit 13 may include all or part of a blade control unit 131, a rotating unit 132, and a motor unit 133.

The blade control unit 131 may be coupled to a bottom portion of the buoyancy generation unit 12. The rotating unit 132 and the motor unit 133 may be sequentially coupled to a bottom portion of the blade control unit 131. As the rotating unit 132 coupled to the blades 1321 rotates by wind, wind energy may be converted into rotational kinetic energy. The rotating unit 132 may transfer the rotational kinetic energy to the motor unit 133, and the motor unit 133 may convert the rotational kinetic energy into electrical energy. In the present instance, the blade control unit 131 may control the heights, surface areas, and angles of the blades 1321 and the distances between the blades 1321 in real time in conjunction with the strength of wind up in the air and the amount of electrical energy production.

The blade control unit 131 may include all or part of an actuator 1311, an upper plate 1312, and a lower plate 1313.

The upper plate 1312 may be coupled to the buoyancy generation unit 12, and the lower plate 1313 may be coupled to the rotating unit 132 of the power generation unit 13. The actuator 1311 may be coupled between the upper plate 1312 and the lower plate 1313. The blade control unit 131 may have a hexapod structure including six actuators 1311. The hexapod structure is a structure including six degrees of freedom, which may allow the blade control unit 131 to operate with precision. However, the structure of the blade control unit 131 is not limited to this, and the number of degrees of freedom may be variously changed as necessary.

The rotating unit 132 may include all or part of the blades 1321, a blade adjuster 1322, the reducer 1323, and a dust cover 1328.

The aero wind power generation device 1 of the present disclosure may be formed by coupling the blades 1321 and the power generation unit 13 in an integrated fashion. The blades 1321 may be vertical wind blades, one end portion of which is coupled to an upper end portion of the power generation unit 13, and the other end portion thereof is coupled to a lower end portion of the power generation unit 13. That is, one end portion of the blades 1321 may be coupled to an external surface of the rotating unit 132, and the other end portion of the blades 1321 may be coupled to an external surface of the motor unit 133. The blades 1321 may be coupled at predetermined intervals along an external surface of the power generation unit 13. For example, six blades 1321 may be coupled at equal intervals along the external surface of the power generation unit 13.

The blades 1321 may be made of high-density urethane or aluminum. Also, the shape, type, and number of blades 1321 may vary depending on weather conditions and location.

The blade adjuster 1322 may be connected to the blade control unit 131 and the blades 1321 and adjust the heights, surface areas, and angles of the blades 1321 and the distances between the blades 1321. The dust cover 1328 may be coupled to cover the top portion of the blades 1321 and the blade adjuster 1322 to block dust or foreign materials.

The reducer 1323 may include all or part of an input shaft 1324, an output shaft 1325, a rotary bearing 1326, and a linear bearing 1327.

The input shaft 1324 may be disposed in the rotating unit 132, and the output shaft 1325 may be disposed in the motor unit 133, so that the rotational kinetic energy of the rotating unit 132 may be transferred to the motor unit 133. In the present instance, the reducer 1323 may be a stepless reducer which is configured for steplessly shifting gears. The motor unit 133 may reduce electrical energy according to the torque and number of rotations varied by the reducer 1323.

The motor unit 133 may include all or part of a power generation motor 1331 and a generation controller 1334.

A rotor 1333 may rotate along with the rotation of the output shaft 1325, and electrical energy may be generated by a magnetic force between the rotor 1333 and a stator 1332 surrounding the rotor 1333.

The generation control unit 1334 may control the power generation motor 1331 and the blade control unit 131. The generation unit 1334 may control the power generation motor 1331 and the blade control unit 131 in accordance with weather conditions and the amount of production of electrical energy, by use of information detected from the sensor unit 115 of the drone unit 11 or a terrestrial sensor. That is, the generation controller 1334 may control the amount of production of electrical energy and the state of the blades 1321 by controlling the power generation motor 1331 and the blade control unit 131.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An aero wind power generation apparatus comprising:
   a drone unit including:
      drone wings configured to make the aero wind power generation apparatus move and hover; and
      a sensor unit configured to detect information for controlling the aero wind power generation apparatus;
   a buoyancy generation unit including a side cover configured to open or close, a balloon disposed inside the side cover and configured to receive gas therein or release the gas therefrom, and a wire configured to surround the balloon; and
   a power generation unit including a rotating unit with a plurality of blades, a blade control unit of adjusting a state of the blades, and a motor unit of converting kinetic energy transferred from the rotating unit into electrical energy.

2. The aero wind power generation apparatus of claim 1, wherein the wire is configured to maintain the balloon in a predetermined form when the balloon is inflated.

3. The aero wind power generation apparatus of claim 1, wherein the wire is configured to apply a compressive force to the balloon when the balloon is compressed.

4. The aero wind power generation apparatus of claim 1, wherein the wire is configured to surround the balloon in a cobweb-shaped structure.

5. The aero wind power generation apparatus of claim 1, wherein the buoyancy generation unit further includes a connection ball positioned in a connection unit of the balloon and the wire.

6. The aero wind power generation apparatus of claim 1, wherein the gas is a helium gas, and
   wherein the helium gas is injected into the balloon when the aero wind power generation apparatus takes off, and the helium gas is retrieved from the balloon when the aero wind power generation apparatus lands.

7. The aero wind power generation apparatus of claim 6, wherein the balloon includes a first zone positioned at an upper end portion of the balloon, and an n-th zone sequentially positioned from the first zone to a lower end portion of the balloon, and
   wherein the n-th zone is a natural number greater than or equal to 2.

8. The aero wind power generation apparatus of claim 7, wherein the helium gas is sequentially injected in an order of the first zone to the n-th zone when the helium gas is injected into the balloon.

9. The aero wind power generation apparatus of claim 7, wherein the helium gas is sequentially retrieved in an order of the first zone to the n-th zone when the helium gas is retrieved from the balloon.

10. The aero wind power generation apparatus of claim 9, wherein the first zone to the n-th zone are sequentially stacked when the helium gas is retrieved from the balloon.

11. The aero wind power generation apparatus of claim 7, wherein the buoyancy generation unit further includes a plurality gas inlets connected respectively to the first zone to the n-th zone.

12. The aero wind power generation apparatus of claim 1, wherein the balloon is made of a urethane material with predetermined durability.

13. The aero wind power generation apparatus of claim 1, wherein the side cover is opened or closed using a bar linkage.

14. The aero wind power generation apparatus of claim 1, further including:
- a cable configured so that a first end portion thereof is connected to the power generation unit and a second end portion thereof is connected to an external battery of the aero wind power generation apparatus to transmit the electrical energy, wherein the cable further includes a gas retrieval tube.

15. An aero wind power generation apparatus comprising:
- a drone unit including drone wings configured to make the aero wind power generation apparatus move and hover and a sensor unit configured to detect information for controlling the aero wind power generation apparatus;
- a buoyancy generation unit including:
  - a side cover configured to open or close; and
  - a collapsible balloon disposed inside the side cover and configured to receive gas therein or release the gas therefrom and enable collapsing and spreading thereby; and
- a power generation unit including:
  - a rotating unit with a plurality of blades;
  - a blade control unit of adjusting a state of the blades; and
  - a motor unit of converting kinetic energy transferred from the rotating unit into electrical energy.

16. The aero wind power generation apparatus of claim 15, wherein the balloon includes a plurality of collapsible tube units and a collapsible skin unit positioned between the plurality of collapsible tube units.

17. The aero wind power generation apparatus of claim 16, wherein the balloon further includes a flexible hinge unit configured to assist in collapsing and spreading the balloon.

18. The aero wind power generation apparatus of claim 16, wherein the tube units and the skin unit spread when the gas is injected into the balloon, and are collapsed when the gas is retrieved from the balloon.

19. The aero wind power generation apparatus of claim 16, wherein each of the tube units includes:
- a main tube configured to inject the gas;
- a bypass tube connected to a portion of the main tube and configured to bypass the main tube so as to not inject the gas into the main tube; and
- a valve connected to the portion of the main tube and configured to adjust a path of the gas transferred to the main tube and the bypass tube.

20. The aero wind power generation apparatus of claim 19, wherein each of the tube units further includes a wireless communication unit configured to control the valve.

\* \* \* \* \*